Figure 5:
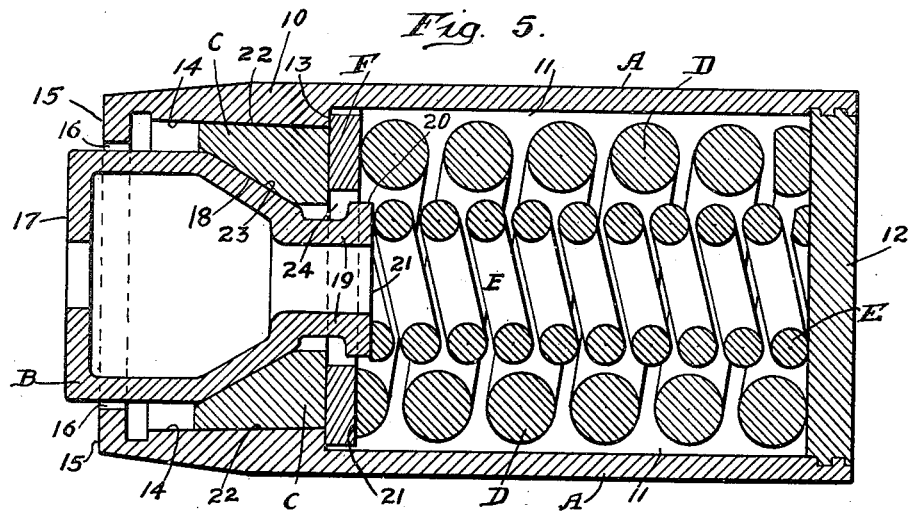

June 8, 1948.  G. E. DATH  2,442,799
FRICTION SHOCK ABSORBING MECHANISMS FOR RAILWAY DRAFT RIGGINGS
Filed Feb. 8, 1945  2 Sheets-Sheet 1
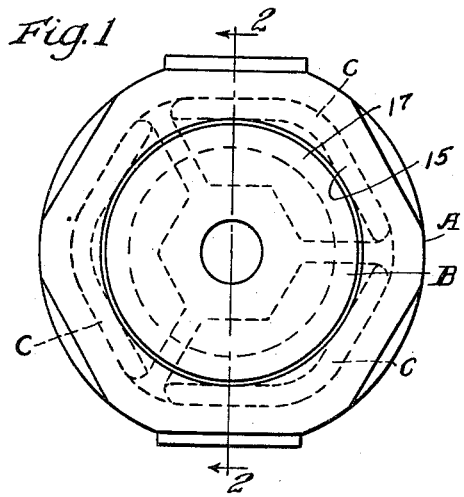
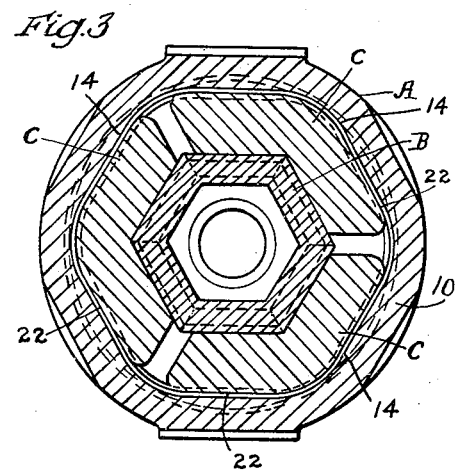
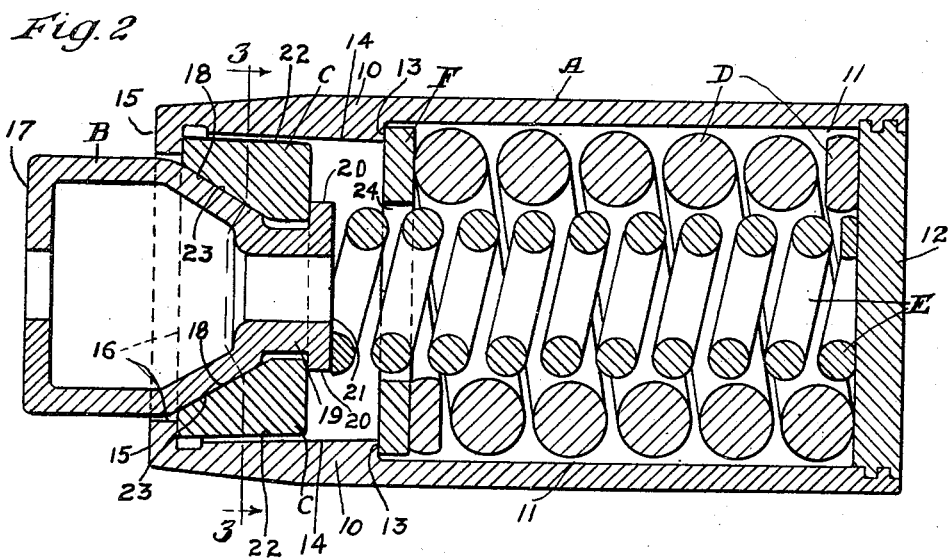
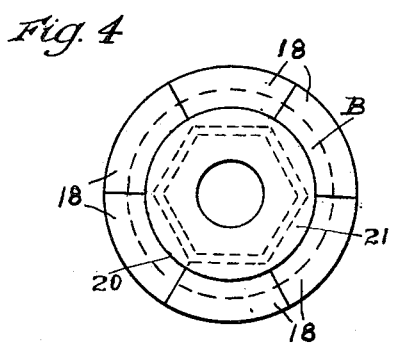
Inventor
George E. Dath
By Henry Fuchs
Atty.

Inventor
George E. Dath.
By Henry Fuchs.
Atty.

UNITED STATES PATENT OFFICE 2,442,799

FRICTION SHOCK ABSORBING MECHANISMS FOR RAILWAY DRAFT RIGGINGS

George E. Dath, Mokena, Ill., assignor to W. H. Miner, Inc., Chicago, Ill., a corporation of Delaware Application February 8, 1945, Serial No. 576,730

8 Claims. (Cl. 213—34)

This invention relates to improvements in friction shock absorbing mechanisms especially adapted for railway draft riggings.

One object of the invention is to provide a friction shock absorbing mechanism including a column element and a cooperating spring resisted friction clutch slidable lengthwise of said column element, wherein gripping action of the clutch is delayed until the mechanism is compressed to a predetermined extent to provide preliminary spring action for absorbing the lighter shocks followed by high frictional resistance by gripping action of the clutch to absorb the heavier shocks.

A further object of the invention is to provide a mechanism as set forth in the preceding paragraph wherein the friction clutch includes a plurality of friction shoes and a wedge member for wedging the shoes into tight frictional engagement with the column element, and the spring means which resists inward movement of the clutch includes separate spring members independently resisting inward movement of the shoes and wedge respectively, there being a predetermined amount of lost motion between the shoes and the spring member which cooperates therewith to provide for the preliminary spring action of the mechanism by compression of the spring which cooperates with the wedge member and produces the heavier frictional resistance after the lost motion between the shoes and spring which cooperates with the shoes has been taken up.

A more specific object of the invention is to provide a friction shock absorbing mechanism comprising a friction casing; friction shoes slidingly telescoped with the casing; a pressure transmitting wedge block movable inwardly of the casing and having wedging engagement with the shoes; a spring member reacting between the casing and the wedge yieldingly opposing inward movement of the wedge only; an additional spring member yieldingly opposing inward movement of the shoes; and a spring follower interposed between the second named spring and shoes, wherein the spring follower is normally held spaced inwardly from the shoes to permit inward movement of the wedge block and shoes to a predetermined extent before the shoes actively engage the spring follower to compress said additional spring, thereby providing initial light spring action during relative movement of the shoes and spring follower, followed by high frictional resistance during the remainder of the compression stroke.

Other objects of the invention will more clearly appear from the description and claims hereinafter following.

Figure 6:
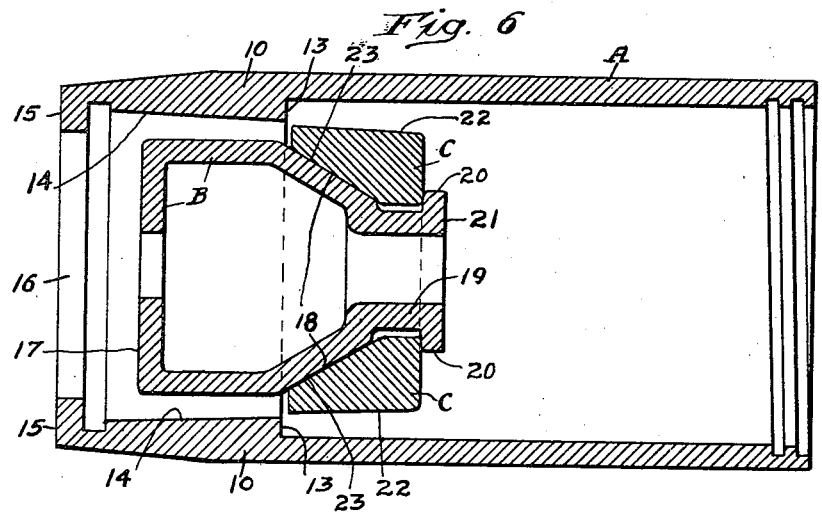

In the drawings forming a part of this specification, Figure 1 is a front elevational view of my improved friction shock absorbing mechanism. Figure 2 is a longitudinal, vertical sectional view, corresponding substantially to the line 2—2 of Figure 1. Figure 3 is a transverse, vertical sectional view, corresponding substantially to the line 3—3 of Figure 2. Figure 4 is a rear elevational view of the wedge block of my improved mechanism, looking from right to left in Figure 2. Figure 5 is a view similar to Figure 2 showing the mechanism partly compressed. Figure 6 is a view similar to Figure 2, illustrating the manner of assembling the mechanism.

As shown in the drawings, my improved friction shock absorbing mechanism comprises broadly a friction casing A; a wedge block B; three friction shoes C—C—C; a main spring resistance D; a preliminary spring resistance E; and a spring follower ring F.

The casing A is in the form of a tubular casting having the walls at the front end thereof inwardly thickened, thereby providing the friction shell section 10 of the casing. Rearwardly of the friction shell section 10, the casing provides a spring cage portion 11, which is of substantially cylindrical cross section. The rear end of the casing A is closed by a threaded disc member which forms the rear wall 12 of the casing. The friction shell section 10 of the casing is of hexagonal, transverse cross section and the inwardly thickened walls thereof provide a transverse stop shoulder 13 at the inner end of the shell section, which serves as a front stop for limiting outward movement of the spring follower ring F. The friction shell section 10 presents three longitudinally extending, interior friction surfaces 14—14—14 which are of V-shaped, transverse cross section. At the open front end, that is, forwardly of the friction surfaces 14 of the casing, the casing is provided with an inturned stop flange 15 adapted to limit outward movement of the friction shoes C—C—C, as hereinafter pointed out. The inner edge of the flange 15 defines a truly circular opening 16.

The wedge B is in the form of a hollow block of generally cyclindrical, transverse cross section, having a flat, transverse, front end face 17 adapted to be engaged by the usual follower of the railway draft rigging. At the rear end portion thereof, the wedge block B is provided with three wedge faces 18—18—18 of V-shaped, transverse cross section, which are arranged symmetrically about the longitudinal axis of the mechanism and converge inwardly. Rearwardly of the wedge faces 18—18—18, the wedge block B is provided with a hollow, tubular extension 19, having a laterally outwardly extending flange 20 at its rear end. The flange 20 is preferably of circular outline. The flange 20 presents a flat end face 21, which serves as an abutment for the front end of the preliminary spring E.

The friction shoes C—C—C are three in number and surround the rear end portion of the wedge block B. Each shoe C is of V-shaped, transverse section and has an outer friction surface 22 which is of V-shaped, transverse cross section and is adapted to engage with one of the V-shaped friction surfaces 14 of the casing A. On the inner side, each shoe C is provided with a V-shaped wedge face 23, which is engaged with the corresponding V-shaped wedge face 18 of the block B.

As will be evident, the wedge block B, together with the friction shoes C—C—C, form an expandible clutch which is slidingly mounted within the friction casing A, the clutch being in contracted condition in the normal position of the parts with clearance between the friction surfaces of the shoes and the friction surfaces of the casing.

The spring follower F is in the form of a flat, disclike member having a central, circular opening 24, adapted to freely accommodate the circular flange 20 of the wedge block B. The spring follower F, which is in the form of a ring, normally bears against the shoulder 13 of the casing A. The spring follower F is thus restricted in its outward movement with respect to the casing A to hold the same normally spaced inwardly from the inner ends of the friction shoes C—C—C.

The main spring resistance D is in the form of a heavy helical coil, which surrounds the spring E. The spring D is interposed between the spring follower ring F and the rear wall 12 of the casing and has its front and rear ends bearing directly on said spring follower and casing wall.

The preliminary spring E is in the form of a relatively light coil, extending through the opening 24 of the spring follower ring F and having its front and rear ends bearing respectively on the rear end face 21 of the wedge block B and the end wall 12 of the casing A.

In assembling the mechanism, the parts are all inserted through the rear end of the casing A, the clutch comprising the wedge B, assembled with the shoes C—C—C, being first inserted. As shown most clearly in Figure 6, the clutch in contracted condition is of such a size as to pass freely between the rear end portions of the friction surfaces 14—14—14 of the casing A. After the clutch has been inserted, it is moved forwardly until the shoes are shouldered against the flange 15 of the casing. The spring follower ring F and the springs D and E are then placed within the casing, the spring follower ring being placed in abutment with the shoulder 13. After the parts have been completely assembled, the casing is closed by applying the screw threaded disc 12, which forms the rear wall thereof.

The operation of my improved friction shock absorbing mechanism is as follows: Upon compression of the mechanism between the front and rear followers of the railway draft rigging, the wedge block B is forced inwardly of the casing against the resistance of the preliminary spring E, and the friction shoes are carried inwardly with the wedge block. During the described action, there is no frictional resistance produced between the friction shoes and the friction surfaces of the casing A inasmuch as inward movement of the shoes is unopposed by any resistance means. A light preliminary spring action is thus produced. As the wedge B and the shoes C—C—C continue to move inwardly of the casing, during further compression of the mechanism, the shoes engage and pick up the spring follower ring F, thereby compressing the spring D during the remainder of the compression stroke of the mechanism. Due to the resistance offered by the spring D, a wedging action is set up between the wedge block B and the friction shoes C—C—C, and the shoes are spread apart and forced into tight frictional contact with the friction surfaces of the casing. High frictional resistance is thus produced during the last described action, thereby taking care of the heavier shocks to which the mechanism is subjected. When the actuating force is reduced, the expansive action of the springs D and E returns all of the parts to the normal full release position shown in Figure 2, the spring D forcing the spring follower ring F outwardly until limited by the shoulder 13 of the casing A and the spring E forcing the wedge outwardly until outward movement thereof is limited by engagement of the friction shoes C—C—C with the flange 15 of the casing A, outward movement of the wedge block B with respect to the shoes being positively limited by engagement between the flange 20 of the wedge block and the shoes C—C—C. As will be evident, the shoes C—C—C are carried forwardly in unison with the wedge block B by shouldered engagement with the flange 20.

I claim:

1. In a friction shock absorbing mechanism, the combination with a column element having lengthwise extending friction surfaces; of a friction clutch slidable lengthwise of said element, said clutch including a wedge pressure transmitting member and friction shoes cooperating with the friction surfaces of said element, said pressure transmitting member and shoes having cooperating wedge faces; a spring yieldingly opposing inward movement of said wedge member only; yielding means cooperating with said shoes; and means on said wedge engaging said shoes to move the same outwardly in unison with the wedge away from said yielding means during expansion of the mechanism, said shoes being movable inwardly of said column element with said wedge member, by engagement of said wedge faces thereof, toward and into engagement with said yielding means to compress the same, thereby setting up wedging action between said wedge member and shoes to force the shoes into tight frictional engagement with the column element.

2. In a friction shock absorbing mechanism, the combination with a friction casing having interior friction surfaces; of a friction clutch slidingly telescoped within the casing, said clutch including a central wedge member and friction shoes surrounding said wedge member and movable inwardly and outwardly of the casing therewith; a spring follower; means for limiting outward movement of said spring follower and normally holding the same spaced inwardly from said shoes; a spring yieldingly resisting inward movement of said spring follower, said shoes being movable inwardly of the casing with said wedge member and toward said spring follower to engage and force the same inwardly against the resistance of said spring after the mechanism has been partly compressed and the wedge member has been forced inwardly to a predetermined extent, thereby setting up wedging action between the wedge and shoes; and a second spring bearing directly on said wedge and reacting between said wedge and casing directly resisting inward movement of the wedge throughout the entire compression stroke of the mechanism.

3. In a friction shock absorbing mechanism, the combination with a friction column element having longitudinally extending friction surfaces; of a friction clutch slidable lengthwise of said element, said clutch including a wedge member adapted to receive the actuating force, and cooperating friction shoes movable inwardly and outwardly of said element with said member; a spring follower; means for limiting outward movement of said spring follower and normally holding the same spaced inwardly from said shoes; a spring yieldingly resisting inward movement of said spring follower, said shoes being movable inwardly of said element with said wedge member toward said spring follower to engage and force the same inwardly against the resistance of said spring after the mechanism has been partly compressed and the wedge member has been moved inwardly to a predetermined extent, thereby setting up wedging action between the wedge and shoes; and a second spring bearing directly on said wedge and reacting between the wedge and column element directly resisting inward movement of said wedge throughout the compression stroke of the mechanism.

4. In a friction shock absorbing mechanism, the combination with a tapered friction casing having interior, inwardly converging friction surfaces; of a plurality of friction shoes slidable within the casing and being engageable with said friction surfaces; a pressure transmitting wedge member movable inwardly and outwardly of the casing, said member and shoes having cooperating wedge faces; a spring follower having shouldered engagement with the casing to limit outward movement thereof and hold the same normally spaced inwardly from said shoes; a spring bearing directly on said wedge and reacting between said casing and wedge for yieldingly opposing inward movement of the wedge throughout the compression stroke of the mechanism; and a second spring reacting between said casing and spring follower yieldingly opposing inward movement of said follower, said shoes being movable inwardly of the casing with said wedge member and toward said spring follower to engage and force the latter inwardly of the casing after said wedge member has been forced inwardly to a predetermined extent, thereby setting up wedging action between said member and shoes to force the shoes into tight frictional engagement with the casing.

5. In a friction shock absorbing mechanism, the combination with a tapered friction casing having inwardly converging, interior friction surfaces; of a friction clutch slidingly telescoped within the casing, said clutch including a central wedge member and friction shoes surrounding said wedge member and movable inwardly and outwardly of the casing therewith lengthwise of said friction surfaces; a spring follower; means for limiting outward movement of said spring follower and normally holding the same spaced from said shoes; a spring yieldingly resisting inward movement of said spring follower, said shoes being movable inwardly of the casing with said wedge member toward and into engagement with the spring follower to force said follower inwardly against the resistance of said spring after the mechanism has been partly compressed, thereby setting up wedging action between the wedge and shoes; and a second spring bearing directly on said wedge and reacting between said wedge and casing throughout the compression stroke of the mechanism directly resisting inward movement of the wedge.

6. In a friction shock absorbing mechanism, the combination with a friction casing; of a wedge pressure transmitting member movable inwardly of the casing; a spring bearing directly on said member to yieldingly oppose inward movement of said member; a spring follower within the casing; spring means yieldingly opposing inward movement of said spring follower; and a friction shoe movable inwardly of the casing with said member and towards said spring follower to engage and force the same inwardly of the casing against the resistance of said spring means, thereby setting up wedging action between said member and shoe to force the shoe into tight frictional engagement with the casing.

7. In a friction shock absorbing mechanism, the combination with a column element having friction surfaces extending lengthwise thereof; of a pressure transmitting wedge member movable lengthwise of said column element; a spring bearing directly on said wedge member and reacting between said column element and wedge member opposing inward movement of the latter throughout the compression stroke of the mechanism; a spring follower having shouldered engagement with said element to limit outward movement of the spring follower; a second spring reacting between said column element and spring follower, yieldingly opposing inward movement of said spring follower; and friction shoes having lengthwise sliding movement with respect to said element, said shoes and wedge having cooperating wedge faces, said shoes having their inner ends normally spaced from said spring follower, said shoes being engaged by said wedge member and movable inwardly with said member and towards said spring follower to engage and force the same inwardly of the casing against the resistance of said second named spring, thereby setting up wedging action between said member and shoes to force the latter into tight frictional engagement with said element.

8. In a friction shock absorbing mechanism, the combination with a friction casing having interior friction surfaces; of a pressure transmitting wedge member movable inwardly and outwardly of the casing; a spring bearing directly on said wedge member and reacting between said casing and wedge member to yieldingly oppose inward movement of said wedge throughout the compression stroke of the mechanism; a spring follower having shouldered engagement with the casing to limit outward movement thereof; a second spring reacting between said casing and spring follower yieldingly opposing inward movement of said spring follower; and a plurality of friction shoes slidable lengthwise within the casing, said shoes and wedge having cooperating wedge faces, said shoes having their inner ends normally spaced outwardly away from said spring follower, said shoes being engaged by said wedge member and movable inwardly with said member and towards said spring follower to engage the inner ends of said shoes with said spring follower and force said spring follower inwardly of the casing against the resistance of said second named spring, thereby setting up wedging action between said member and shoes to force the latter into tight frictional engagement with said casing.

GEORGE E. DATH.

REFERENCES CITED

The following references are of record in the file of this patent:

UNITED STATES PATENTS

| Number | Name | Date |
|---|---|---|
| 1,689,451 | O'Connor | Oct. 30, 1928 |
| 2,329,338 | Dath | Sept. 14, 1943 |